Nov. 23, 1965 T. GUTIERREZ 3,219,339
ARTICLE SEPARATING APPARATUS
Filed July 25, 1962 4 Sheets-Sheet 4
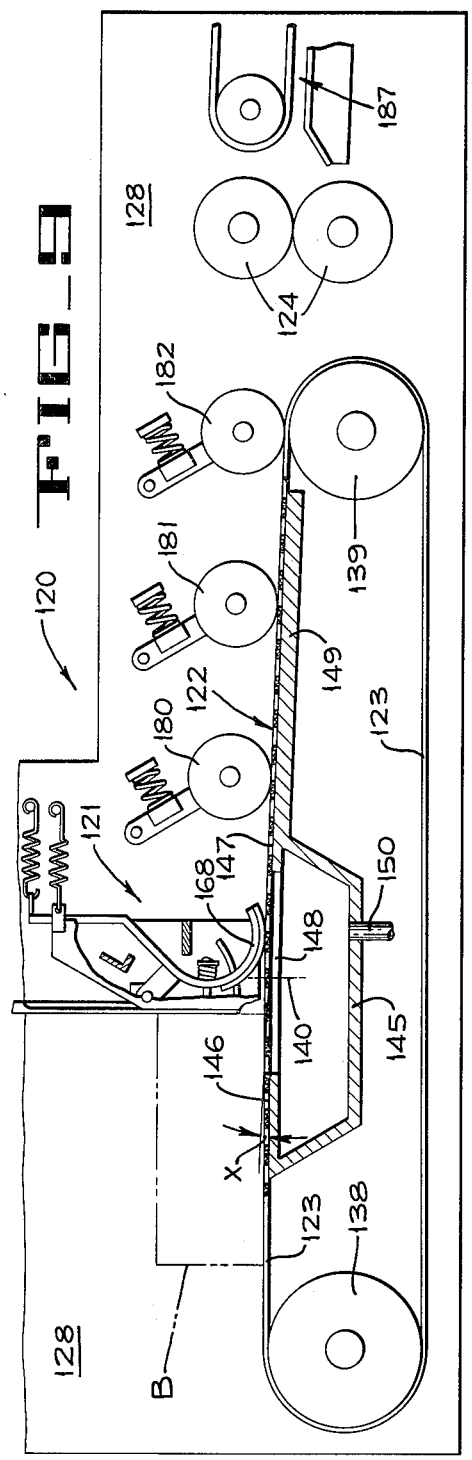
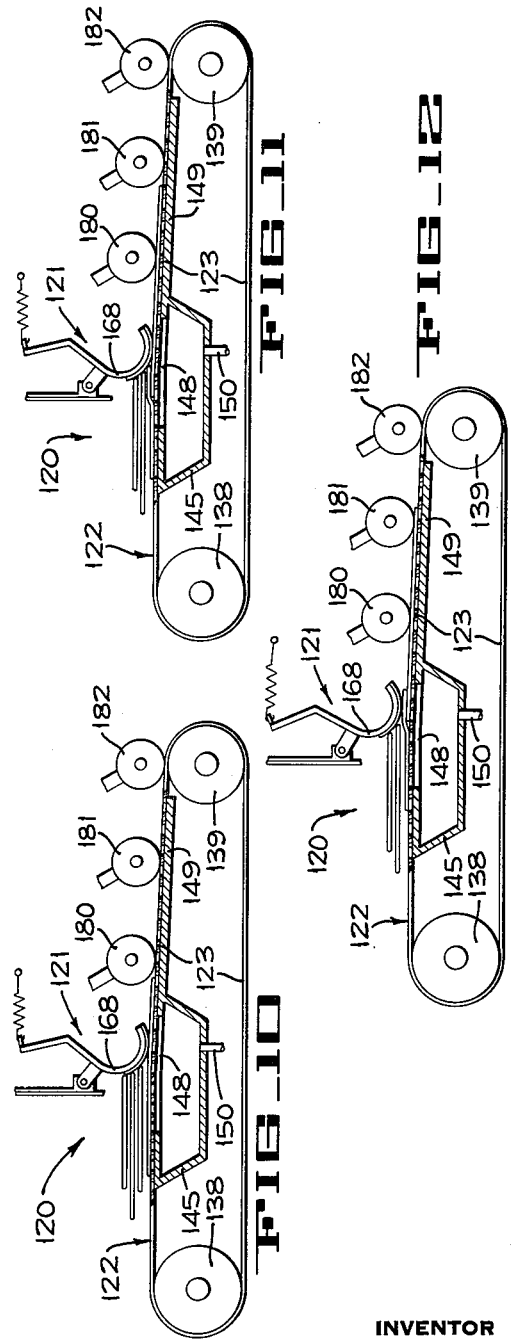
INVENTOR
THOMAS GUTIERREZ
BY
ATTORNEY United States Patent Office 3,219,339
Patented Nov. 23, 1965

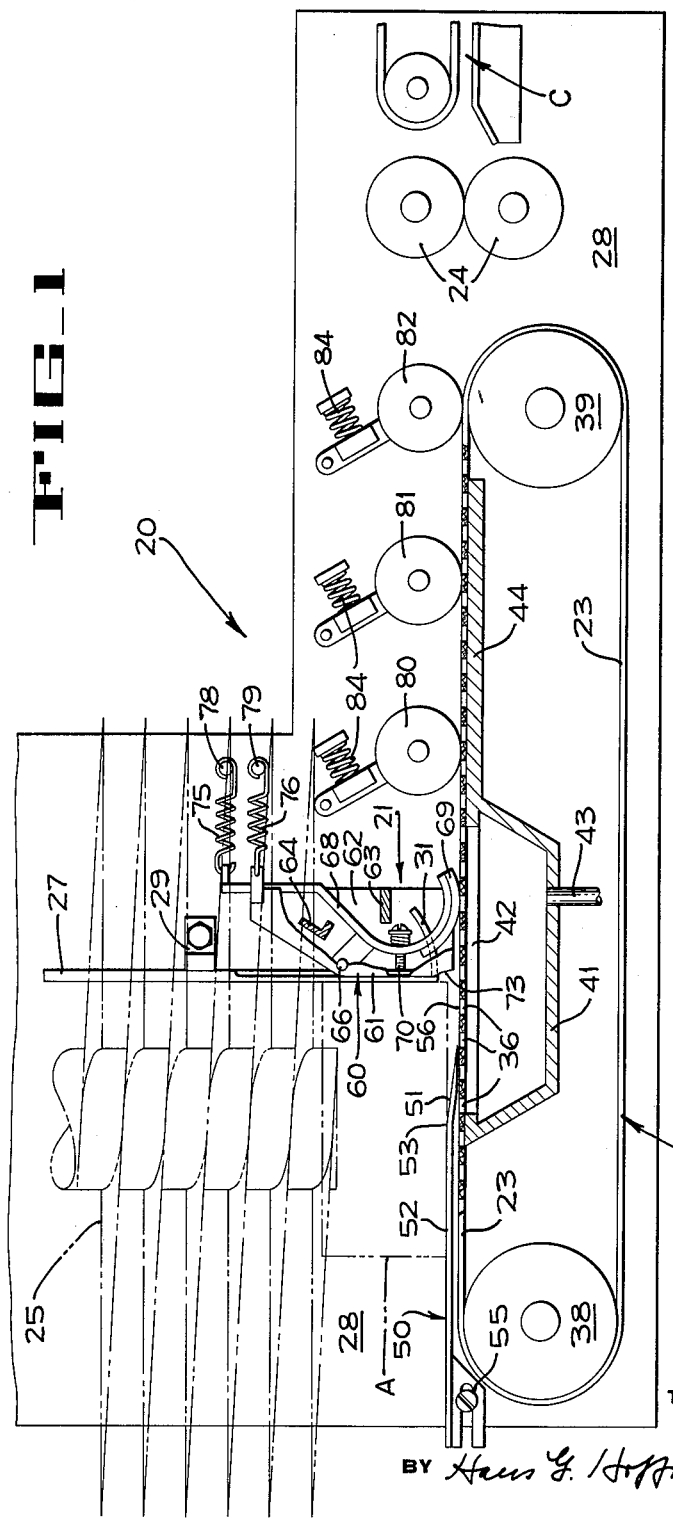

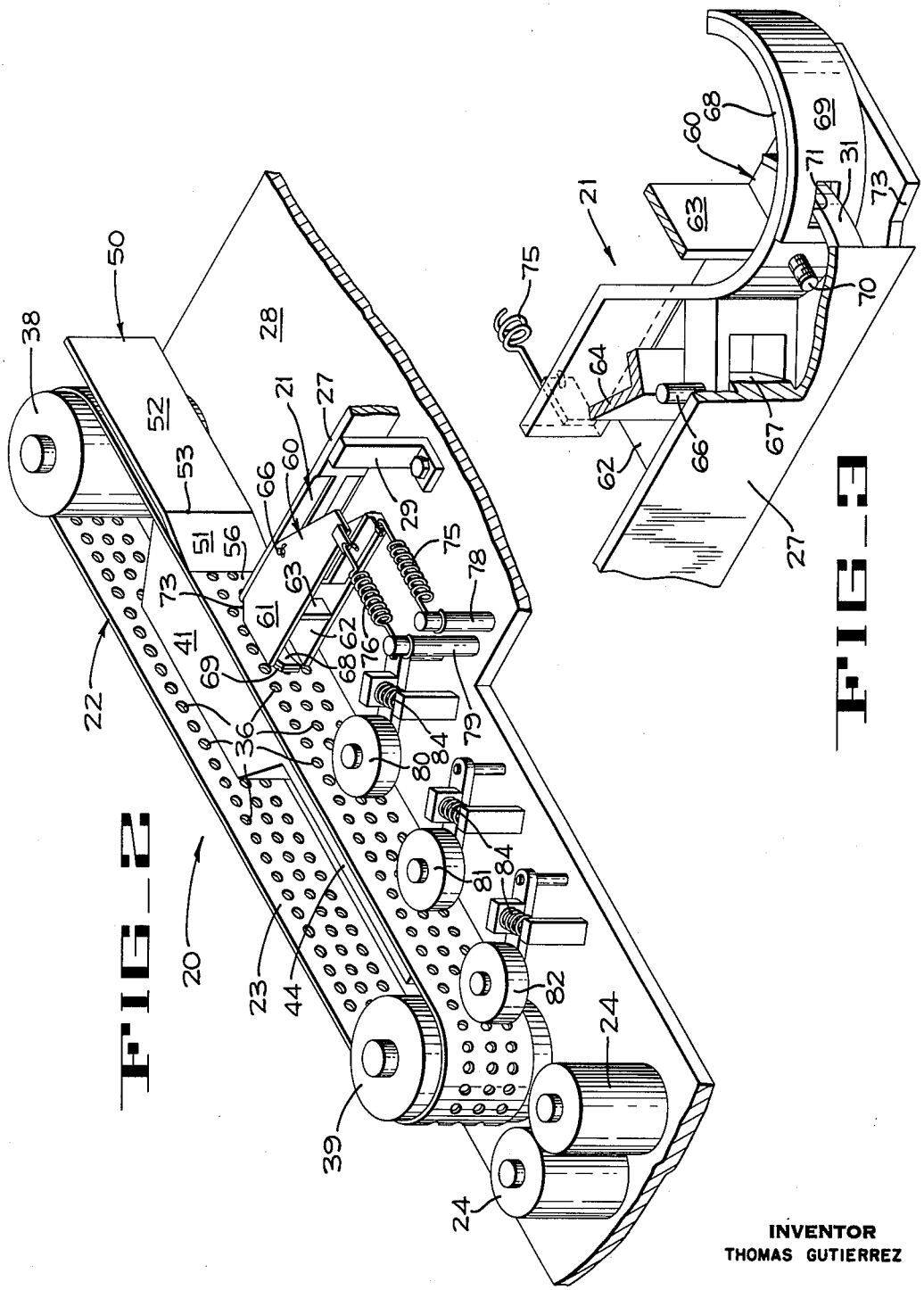

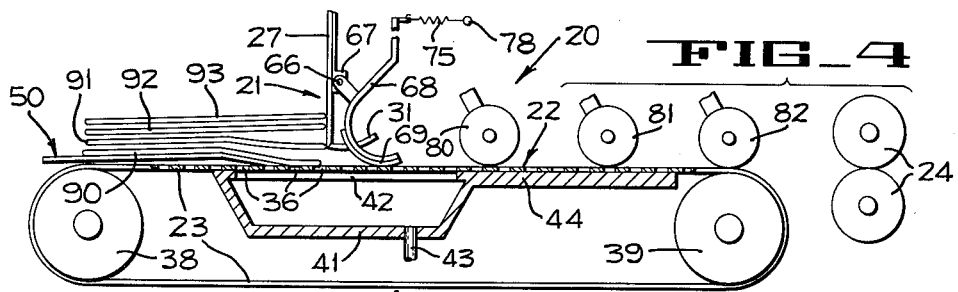
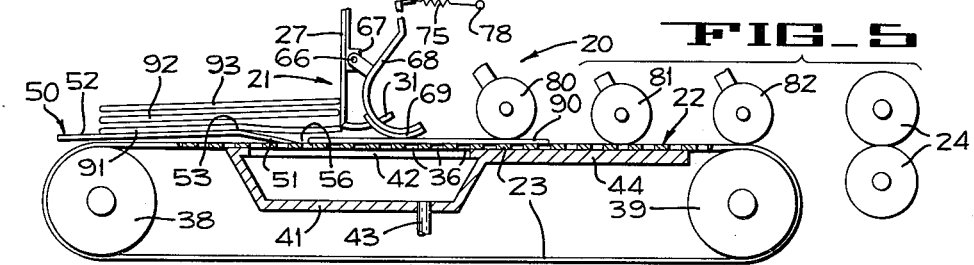
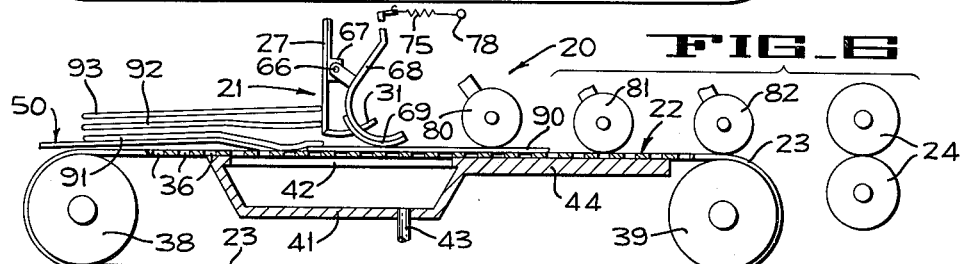
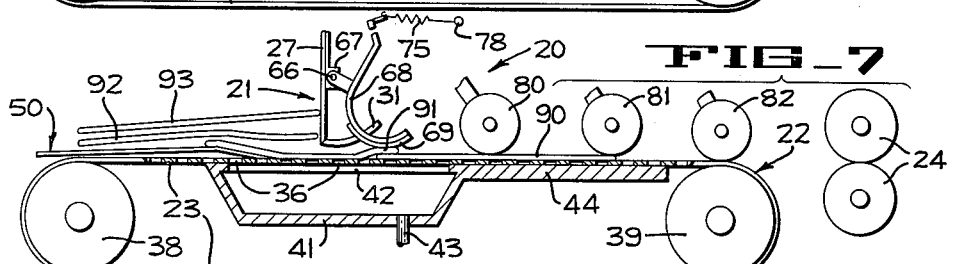
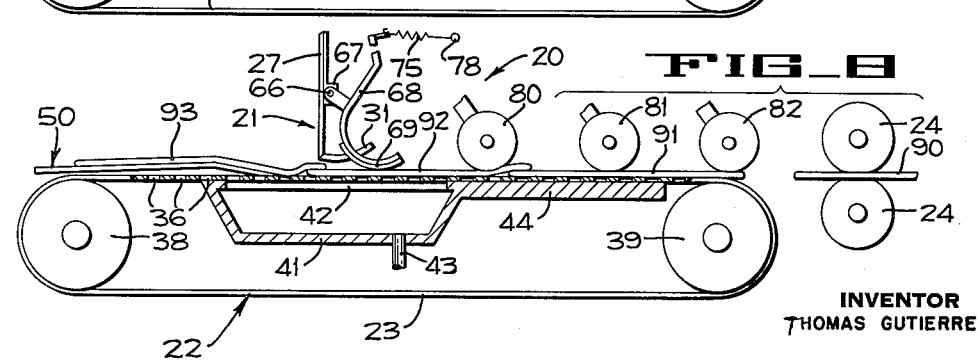

3,219,339
ARTICLE SEPARATING APPARATUS
Thomas Gutierrez, Santa Clara, Calif., assignor to FMC Corporation, San Jose, Calif., a corporation of Delaware
Filed July 25, 1962, Ser. No. 212,242
14 Claims. (Cl. 271—11)

The present invention relates to article separating apparatus and more particularly to apparatus for separating flat articles, such as letters or the like, by removing such articles one at a time from a stack and feeding them forwardly in spaced relationship.

Heretofore, devices which have been designed to separate and feed thin, flat articles one at a time from a stack of the same, i.e., to singulate such articles, have utilized one of two basic methods for performing such an operation. One method involves the use of a movably mounted, flat feeding finger which is adapted to slip the end article off of or out from the stack. The disadvantages of such a method are that it is generally only suitable for articles of uniform size and shape, and that it is rather ineffective for very thin articles such as letters, sheets of paper, or the like.

Another method of separating and feeding flat articles which has been employed in the feeding of very thin or flexible articles, such as letter mail, involves the use of an endless vacuum feed belt. Commonly, such belts are utilized by placing one end of a stack of articles to be singulated against the belt and applying a vacuum pressure along the rear side of the belt to grip and remove the terminal article from the stack. Such a system is generally effective as long as all of the articles to be singulated are of uniform thickness and size. However, when articles of different thicknesses and different lengths are stacked together, such as in the handling of mail, the desired feed of the articles forwardly in spaced, single file relationship has proved difficult to achieve without the addition of complex and costly mechanisms to assure that only one article at a time will be affected by the vacuum belt. When very thin letters or post cards are stacked together, there has been a tendency in the prior art devices to pass two of such letters or cards together.

Commonly, in known devices of the type described, singulation has been effected at the position of the "gate" or limiter which is located adjacent the terminal end of the stack and which is closely spaced from the belt in a position to block off the major portion of the stack and allow only the endmost letter to be slipped thereunder as it is propelled by the face of the belt. These gates can be adjusted so that they are fixed at a predetermined distance from the face of the belt and will operate satisfactorily where the articles in the stack are of uniform thickness. However, if articles of different thicknesses are encountered, the gates must be made flexible to pass such articles. This has caused serious difficulties, particularly with letter mail singulation, because a gate that is sufficiently flexible to accommodate thick letters will pass too many thin letters without properly spacing them. Furthermore, devices which depend upon precise gate adjustment soon get out of adjustment due to wear of the gate. Other subsidiary devices including various arrangements of plural gates and apparatus for producing varying vacuum effects have been designed in an effort to overcome the above-mentioned problems, and, in general, such devices have resulted in material increases in the cost, complexity, and cumbersomeness of the apparatus.

It is an important feature of the present invention that the complete separation or singulation of the articles is not performed at a gate at all. The "gate" of the present invention merely cooperates with the vacuum belt, the vacuum supplying means, and the article stack to cause the articles to flow in a line, with some regulated overlapping between the individual articles. When the articles are thus arranged, the actual singulation can be accomplished by a pair of accelerating pinch rollers which are positioned at one end of the vacuum belt and grip the lead letter to quickly separate it from the trailing letter, which remains on the belt during this process. Such a device is not critical in the adjustment of the gate and the stack area, and, therefore, it eliminates the necessity for the fine tolerances or the special subsidiary mechanisms required in the aforementioned article separators.

It is, therefore, an object of the present invention to provide an improved article separating device which will effectively separate flat articles of random sizes, shapes and thicknesses and feed such articles in a line with a minimum spacing between each article.

Another object of the present invention is to provide an article separating apparatus of the vacuum feed belt type which does not rely upon a flexible gate or special vacuum pressure arrangement to provide complete separation of the articles at the gate but utilizes the belt only to initially provide a spread in a series of articles before accomplishing complete separation in a simple and efficient manner.

Another object of this invention is to provide an article separating mechanism which will gently handle and separately space a plurality of stacked articles without tearing, ripping, or otherwise mutilating the same.

Another object is to provide a mechanism for feeding a series of flat articles, such as letters or the like, in spaced relationship after receiving the same from a stack whereby such mechanism may be easily adjusted to separate and feed uniform articles with a predetermined spaced and nonuniform articles with a predetermined minimum spacing.

Another object of the present invention is to provide apparatus for separating a series of letters of different thicknesses and sizes from a stack in two distinct stages by first partially separating the letters into an overlapped linear arrangement and then further separating the letters into spaced relationship for feeding to mail processing equipment such as the automatic marking or cancelling machines.

FIGURE 1 is a plan of the apparatus of the present invention with parts thereof being broken away for the purpose of illustration and showing such apparatus operating in combination with a stacking mechanism that is shown in phantom lines.

FIGURE 2 is an isometric of the article separating apparatus of FIGURE 1.

FIGURE 3 is an enlarged fragmental isometric of a portion of FIGURE 2 with parts thereof being removed or broken away for the purpose of illustration.

FIGURES 4, 5, 6, 7 and 8 are diagrammatic operational views similar to FIGURE 1 and showing the article separating apparatus of the present invention in five sequential stages of its operation.

FIGURE 9 is a plan of a modified form of the present invention.

FIGURES 10, 11 and 12 are diagrammatic operational views similar to FIGURE 9 and showing the apparatus of FIGURE 9 in three sequential stages of its operation.

While the present invention will be described as embodied in apparatus which has been specifically designed to handle the separating or singulating of letters or post cards, as in an automatic mail handling system, it is to be understood that the invention is by no means to be limited to this particular use but is of significant value in the handling of many similar articles such as sheets, cards, or flat blanks of various types. The invention, however, is of particular utility in the mail handling field since it is adapted to operate efficiently with articles of non-uniform size and thickness.

Referring now more specifically to the drawings, and particularly to FIGURES 1 through 3, a first embodiment 20 of the article separating apparatus of the present invention is illustrated for feeding individual letters in spaced relationship from a stack A and moving them toward the right (FIG. 1) to a take-away conveyor C. This apparatus generally includes a retaining structure 21 for holding the letters of stack A in aligned upright position, a vacuum belt feeding mechanism 22 including an endless vacuum belt 23, and accelerating pinch rollers 24. The vacuum belt feeding mechanism is adapted to pick off one letter at a time from the forward or terminal end of the stack A, feed the same toward the right (FIG. 1) beneath the retaining structure 21 in overlapped relation with the adjacent letters from the stack A, and transmit such series of letters to the accelerating rollers 24 where they are further separated into their final spaced relationship.

As previously mentioned, the primary function of the apparatus of the present invention is to singulate letters from a stack. Stacks of letters, which have previously been gathered and aligned along two adjacent edges, may be manually placed into position with the flat face of the foremost letter abutting the belt 23 to be operated upon by the subject apparatus. However, in automatic mail systems, such stacks may be continuously provided by a rotating helical wheel letter stacker, such as stacker 25 partially shown in phantom lines in FIGURE 1. The helical wheel stacker 25, which forms no part of the present invention, may be of the form, for example, of the apparatus shown in my pending application for "Article Handling Apparatus," Serial No. 189,737, filed on or about April 24, 1962.

The stacker 25 is adapted to continuously feed a varying stack of upright letters A to the singulating vacuum belt mechanism 22 with the lower edges of the letters resting on a support surface 28 and with their forward or leading edges abutting a rigid, fixed retaining bar 27. The retaining bar is fixed in position on the flat support member 28 by means of a mounting bracket structure 29 (FIG. 2) which is rigidly fastened to the retaining bar and bolted to the support member. The end 31 of the retaining bar is turned outwardly in a smooth arc and is spaced from the vacuum belt 23 by a distance dependent upon the thickness of the particular articles to be singulated. The distance must be such as to pass the thickest article that the apparatus will be called upon to handle. In the case of letter mail, this may amount to the thickness of four or five normal letters. The end 31 of the retaining bar is extended a predetermined distance away from the stack to prevent letters from being drawn behind the bar.

The vacuum belt feeding structure 22 comprises primarily the endless belt 23 having a suitable frictional engagement surface and its associated structure, the belt being provided with a plurality of perforations 36 throughout its length to allow the suction force to be transmitted to the letters. The belt is mounted and driven by means of rollers 38 and 39 which are suitably mounted upon the support structure 28 and driven by any readily available means such as an electric motor (not shown). Located within the runs of the vacuum belt between the rollers 38 and 39 is a vacuum box 41 providing a constant suction force and having a series of vertically spaced, horizontal slots 42 aligned with the horizontal rows of perforations 36 in the vacuum belt. The vacuum box is mounted upon support structure 28 and is adapted to be connected to a suitable source of vacuum pressure such as a suction pump (not shown) by means of a conduit 43. In addition, a flat, solid extension 44 is attached to one end of the vacuum box in engagement with the underside of the vacuum belt for a purpose later to be made clear. The metallic bearing surfaces of the vacuum box and its extension section which engage the belt 23 are polished and made relatively friction free so that the belt will ride smoothly thereover.

Spacing the foremost or terminal letter of the stack of letters A a predetermined distance from the vacuum belt 23 is a spacer plate 50. As best seen in FIGURE 1, the plate consists essentially of two flat face portions 51 and 52 which are joined together at an apex 53, the portion 51 being relatively short and extending forwardly into engagement with the face of the vacuum belt to space the letter stack therefrom. The section 52 is relatively long as compared with section 51 and serves to support the face of the stack by extending rearwardly from apex 53 so as to form a very shallow angle, in the nature of one or two degrees, with the face of the vacuum belt. Plate 50 is mounted upon the support structure 28 by means of an an adjustable slot and bolt connection 55. The plate keeps the trailing portion of the letters away from the vacuum belt allowing only the forward portion to be engaged and picked up by the belt in the engagement area 56 between the retaining bar 27 and the free edge of the plate portion 51. The particular configuration of the spacer plate has a specific function in fanning out the forward edges of the letters so as to prevent the removal by the belt of two letters at one time, as will presently be made more clear.

Pivotally mounted upon the retaining bar 27 at the terminal portion thereof is a limiter 60 in the form of a movable cage which includes a pair of flat horizontal restraining plates 61 and 62 spaced by supports 63 and 64 (FIG. 3). Each of the restraining plates, which are rigidly fastened together by the supports, are pivotally mounted upon the retaining bar 27 by means of a pivot pin 66 journalled in a boss 67 at the rear side of the retaining bar. The pivot pin 66 also pivotally mounts a movable restraining gate 68, the leading edge of which is rounded and provided with a replaceable rubber facing 69 adapted to ride against the surface of the vacuum belt 23 and to be pivoted therefrom by letters which are carried forwardly by the belt. The gate is held in position by an adjustable stop 70 (FIG. 1) which abuts the retaining bar 27 and limits the movement of the gate toward the bar 27. If desired, the stop 70 may be adjusted so that the face 69 will be spaced slightly from the belt 23 to prevent excessive wear on the facing. It must be remembered, however, that the spacing between the gate and the belt must be such that the thinnest letter or post card to be singulated will contact the gate so that the trailing letter is restrained in its forward movement. As clearly illustrated in FIGURE 3, the end 31 of the retaining bar extends through an aperture 71 in the gate and does not interfere with the gate during its pivotal movement.

The function of the limiter cage 60 is to prevent an excess of letters or cards from engaging the restraining gate 68, and, for this purpose, the plates 61 and 62 are provided with bearing edges 73 which extend from the end 31 of the retaining bar 27 to a position spaced slightly from the face of the belt 23, preferably a distance sufficient to allow two letters of average thickness to pass under the plates without disturbing them. Connected to the rearward portions of the restraining gate and the limiter cage are a pair of tension springs 75 and 76, respectively. The springs are fixed at their distal ends to stationary posts 78 and 79 which are fixed to the support structure 28. As letters of varying thickness are fed beneath the restraining gate 68 and the limiter cage 60, the springs 75 and 76 provide a means for holding back the additional letters in the stack other than those for which the retaining bar 27 provides a positive stop. If the letters are of average thickness, for example, the limiter 60 may stop two or three and allow only one or two to pass thereunder into engagement with the restraining gate. The restraining gate pivots and allows the letters to travel with the belt as will be more fully explained later in connection with the operation of the device. If an extraordinarily thick letter is brought to the terminal end of the stack, the limiter 60 may pivot against spring 76 to allow it to pass thereunder. For proper operation, it is desirable to have the spring 76 controlling the limiter less stiff than the spring 75 controlling the gate 68. The spring 76 should be just strong enough to hold back the stack which will be urged forwardly in the direction of movement of the belt due to the friction between the letters. The spring 75 can be stiffer than this since the letters which cause the gate to pivot against its restraining spring force are tightly gripped and positively propelled by the vacuum belt.

Once a letter or letters has been passed forwardly under the retaining structure 21, it is carried by the vacuum belt 23 along the face of the extension section 44 of the vacuum box. There is no suction force applied to the letters during this portion of their travel so that they may be more easily pulled apart and spaced by the accelerating rollers 24. Therefore, in order that the letters be assured of continuous forward movement, stabilizing rollers 80, 81 and 82 are provided to urge the letter against the belt for travel therewith. Each of the rollers is pivotally mounted upon the support structure 28 and is provided with a spring 84 to force the freely rotatable portion of the rollers against the belt.

The accelerating rollers 24 are positioned adjacent the end of the belt 23 and are driven at a linear speed greater than that of the belt. Therefore, when a letter is passed from the belt to the rollers it is accelerated in forward speed. It is this acceleration which effectively separates the overlapped letters and spaces them as they are projected forwardly to a take-away conveyor C.

The operation of the above described apparatus will be described in connection with FIGURES 4 through 8. These are partially diagrammatic with the spacing of letters 90, 91, 92 and 93 of a stack of letters to be singulated being exaggerated for the purposes of illustration. In addition, the shape of the spacer plate 50 has been exaggerated for the same reason. The limiter 60 has not been shown.

In FIGURE 4 the lead letter 90 has been drawn down against the face of the vacuum belt 23 due to the suction force from the vacuum box 41. The following letter 91 is spaced from the belt and from the letter 90 due to the particular shape of the spacer plate 50 whose rearward portion 52 tends to direct the forward edge of the letter away from the vacuum belt. In FIGURE 5, the lead letter 90 has been carried by the belt beneath the restraining gate 68, which has pivoted to accommodate it, and into that portion of the device where it rides along the extension 44 and is engaged by the stabilizing rollers 80, 81 and 82. The time that the following letter 91 will be acted upon by the vacuum at the face of the belt in the engagement area 56 will depend upon the particular length of the lead letter 90. This is so because, as the trailing edge of the lead letter 90 moves off the end of the plate 50, and uncovers some holes in the belt, the forward edge of the trailing letter 91 is pulled down against the vacuum belt, positively gripped thereby and moved therewith. This creates an overlapped condition between the first and second letters, as is clearly illustrated in FIGURE 6. FIGURE 7 shows both the first letter 90 and the second letter 91 in their overlapped position being carried past the restraining gate which has been pivoted further away from the belt to accommodate the double letter thickness. It can be appreciated, therefore, that the gate must be adapted to pivot against the urging of its tension spring to accommodate the greatest double-letter thickness which might be expected.

FIGURE 8 shows the final condition of the letters 90 and 91 whereby positive spacing is provided therebetween. When the forward portion of letter 90 reaches the accelerating rollers 24, it is picked up thereby and pulled away from the second letter 91 which previously had overlapped it. The third letter 92 has been passed under the gate in overlapped relation with letter 91, and a fourth letter 93 is pulled by the belt into overlapped relation with letter 92.

Depending upon the various lengths of the letters, a space will be provided between each adjacent letter. This space will be a minimum following the shortest letter in the stack. As previously mentioned, the accelerating rollers 24 feed the letter to a take-away conveyor C which may comprise the feeding line of a marking or cancelling machine in an automatic mail handling system.

It should be noted that the amount of overlap between the letters may be adjusted by varying the adjustable mounting means 55 of the spacer plate 50 to place the forward portion 51 of the spacer plate closer or further from the retaining bar 27 to thus decrease or increase the vacuum gripping area 56. An increase in the area will allow the trailing letter to be received and gripped by the belt 23 sooner to extend the area of overlap between adjacent letters. This spacing should be varied so that the accelerating rollers will remove all of the overlap of the lead letter, even for the shortest letter, before the second letter passes to the accelerating rollers so that a space between letters in the take-away conveyor will always be present.

It should be noted that the separation of the letters is accomplished essentially in two stages. The first is the overlap stage in which the letters are separated sequentially from the stack and placed in continuous overlapped relationship in linear spread fashion upon a moving belt, with the amount of such overlap being easily controlled. The second and final stage in the separating process takes place at the accelerating rollers where each letter is, in turn, propelled forwardly at a rate of speed greater than the trailing overlapped letter to provide spaces between all of the letters as they are fed to further letter processing mechanisms, such as automatic facing, cancelling or coding machines, which are generally designed to accept only a single letter at a time.

One of the important features of the present invention is that the rate of letter flow for a given belt speed can be adjusted by changing the overlap between the letters. The only function of the gate 68 is to hold back the third letter in the stack, if this has not already been accomplished by the limiter plates 61 and 62, and this is easily accomplished without rendering the construction of the gate unduly sensitive to adjustment or critical in construction and resiliency.

Another advantage of permitting the letters to overlap during the first or "spreading" stage of the singulating process is that the more letters overlap, the greater can be the number of letters per linear foot of vacuum belt, and hence the slower can be the speed of the belt to handle a given density of mail. Under these circumstances the handling of the mail by the vacuum belt can be gentle to eliminate the tearing, ripping or mutilating of the individual mail pieces. The accelerating rollers 24, which are preferably formed of resilient rubber or rubber-like material, merely remove the letters one at a time from the belt and can be run at relatively high speeds without damaging the bulk of the letters. To state it differently, the higher the belt speed, the more chance of damage there is to the mail. If the mail can be handled more densely at a lower belt speed, this is an advantage.

A modified form of the present invention is illustrated in FIG. 9. The article separating apparatus 120 there illustrated generally comprises the same component parts as does the aforementioned apparatus 20. These include stack retaining structure 121, vacuum belt feeding mechanism 122 and a vacuum belt 123, a pair of accelerating pinch rollers 124, and a support structure 128. Although not shown in detail, the mechanism for providing letter stack B may be similar to the helical wheel stacker 25 mentioned in relation to the embodiment 20.

Separating apparatus 120 is similar to apparatus 20 both in function as well as in the construction of its component parts except that the manner of achieving the overlap between the separated letters has been changed. The spacer plate 50, which was utilized in the prior described embodiment to prevent the trailing portion of the lead letter from contacting the vacuum feed belt and being propelled thereby, has been omitted from the apparatus 120. Its function is accomplished in the apparatus of FIGURE 9 by providing the vacuum belt 123 with two angularly related linear surface portions for engaging the letters, and by modifying the vacuum box accordingly.

As is apparent in FIGURE 9, driving rollers 138 and 139, which are positioned upon the support structure 128, are of unequal diameter, the roller 138 being of larger diameter. Vacuum belt 123 is similar in construction to the vacuum belt 23 of the prior described embodiment except that it must "break" along a line 140 slightly spaced from its point of engagement with a restraining gate 168. This "break" is achieved by utilizing a vacuum box 145 which includes a first flat surface 146 and a second flat surface 147, the surfaces being angularly related and joined by a break line or apex which defines the "break" 140 in the belt. The angle X (FIG. 9) defined between the surface 146 and an extension of surface 147 is critical and should be in the range from about one to two degrees for handling letter mail and post cards. A series of spaced horizontal slots 148, which are aligned with the horizontal rows of perforations in the vacuum belt, are provided in the vacuum box 145 and extend for short distances away from the apex at break line 140 in both flat surfaces 146 and 147. Surface 147 is extended by a flat rearward extension 149 underlying the vacuum belt 123 which is similar in design and function to the extension 44 of the vacuum box 41. The vacuum box 145 is connected to a suitable source of vacuum pressure by connecting pipe 150. The restraining structure 121, stabilizing rollers 180, 181, 182, accelerating pinch rollers 124, and a take-away conveyor 187 are similar both in construction and in function to the corresponding elements described in connection with the embodiment of FIGURES 1–3, and, therefore, will not be described in detail.

One further feature of the vacuum box 145 is that the vacuum pressure is applied to the leading letter in the stack B only at the forward portion thereof and not throughout its length so as to control the amount of overlap as will presently be made more clear.

FIGURES 10 to 12 show the apparatus 120 in diagrammatic form in three sequential stages of its operation. In FIGURE 10, the foremost letter in the stack has been received by the vacuum belt 123 for transmission under the restraining gate 168 into engagement with the stabilizing rollers 180, 181, 182. The following letter, because of the frictional forces imposed upon it by the terminal letter, is urged forwardly. However, since the face of the vacuum belt is angled away from the position of the letters in the stack at break line 140, the second letter is directed away from the vacuum imposing surface 147 and into the restraining gate where its leading edge is spaced from the first letter which rides under the gate. The second letter will not be moved under the gate until such time as the trailing edge of the first letter has cleared the vacuum applying slots 148 in the vacuum box. Once the vacuum is applied to a sufficient area of the forward portion of the second letter, the leading edge will be pulled under the restraining gate in overlapped relationship with the first letter, and both letters will be moved under the gate and into engagement with the stabilizing rollers from whence they can be separated by the rollers 124.

From the foregoing description, it is apparent that the structures of the present invention provide an improved article separating apparatus which utilizes the known vacuum belt arrangement to singulate letters by separate stages, first spreading the articles into overlapped relationship and then using an efficiently operating and easily adjustable secondary means to space the articles so that they may be in the proper relation for further processing. The structure of the present invention is simple in nature and can be economically produced. It can be adjusted for various forms of flat articles. It is particularly operable, as previously pointed out, to handle letter mail in an automatic mail processing system whereby the articles are of various sizes and thicknesses. Since it uses the vacuum belt only as a means of spreading the articles rather than spacing them, it can operate at slower speeds and thus reduce the possibility of damaging the articles as well as provide a higher rate of article flow per given maximum belt speed.

While two embodiments of the present invention have been shown and described, it will be understood that various changes and modifications may be made therein without departing from the spirit of the invention or the scope of the appended claims.

The invention having thus been described, what is believed to be new and desired to be protected by Letters Patent is:

1. An article separating apparatus comprising a vacuum belt movably mounted for travel in a forward direction, vacuum means adjacent one side of said belt for applying a suction force thereto to affect articles adjacent the other side of the belt, restraining means for maintaining a stack of flat articles with their forward edges aligned and the foremost articles engaging said other side of the belt, means cooperating with said belt and said vacuum means for causing said articles to be moved forwardly with the belt past said restraining means in a predetermined overlapped relationship, and means forwardly spaced from said restraining means for sequentially acting on each article for directly accelerating the forward movement of an article to move it in said forward direction at a higher rate of speed than the next succeeding article and consequently spacing the articles.

2. Article separating apparatus comprising a movably mounted vacuum belt having a plurality of perforations therein, means for continuously advancing said belt, means for aligning and maintaining a stack of flat articles in a position with the foremost article of the stack engaging the face of the belt, means for applying a suction force through said perforations to affect only the forward portion of said foremost article in its initial position to cause it to be advanced with the belt, means for restraining the second article of said stack from advancing with said foremost article until the foremost article has advanced far enough whereby the suction force affects the second article directly, said suction force applying means causing said second article to be carried forwardly with said foremost article in overlapped relationship therewith after affecting the second article and causing it to be gripped by said belt, said suction force being applied through the belt to the articles lying adjacent the belt on both sides of the restraining means and over a sufficient distance to cause the articles to be propelled forwardly away from the restraining means with the belt, and means spaced forwardly from said restraining means for directly accelerating the forward movement of the foremost article to space it from the second article.

3. Article separating apparatus comprising a movably mounted vacuum belt, means for advancing said belt, means for aligning and maintaining a stack of flat articles in a position with the foremost article of the stack engaging the face of said belt, means for applying a suction force through the belt to affect only the forward portion of said foremost article in its initial position to cause it to be advanced with the belt, means for causing the second article in the stack to be diverted at its forward edge from said foremost article until the foremost article has advanced far enough so that the suction force affects the second article directly, restraining means for preventing said second article from being carried forwardly with said foremost article until the second article is affected by said suction force, said suction force applying means causing said second article to be carried forwardly with said foremost article in overlapped relationship therewith after affecting the second article and causing it to be gripped by said belt, said suction force being applied through the belt to the articles lying adjacent the belt on both sides of the restraining means and over a sufficient distance to cause the articles to be propelled forwardly away from the restraining means with the belt, and means spaced forwardly from said restraining means for directly accelerating the forward movement of the foremost article to space it from the second article.

4. Article separating apparatus comprising a movably mounted endless vacuum belt having a plurality of perforations therein, a vacuum supply box extending in contiguous relationship with and on one side of said vacuum belt and having apertures therein for applying a suction force through said perforations, a flexible restraining member positioned adjacent to the belt on the other side thereof for retaining a stack of flat articles with the foremost article in engagement with the face of said belt, said foremost article being caused to move with said belt in a direction laterally away from said stack and past said restraining member upon the application of said suction force, means for directing the forward edge of the second article in the stack away from the vacuum belt until the foremost article has been moved past the restraining member far enough so that said suction force is applied directly to the second article to cause it to move with the foremost article in overlapped relationship therewith, said apertures in the vacuum supply box extending in the direction of the belt for a sufficient distance on both sides of said restraining member so that the overlapped articles will travel forwardly together with the belt, means for maintaining said articles in their overlapped condition as they are carried by the belt in the absence of the suction force, and means adjacent the end of one straight path of motion of said belt for directly accelerating the forward motion of the foremost article to space it from the second article.

5. Article separating apparatus comprising a movably mounted endless vacuum belt having a plurality of perforations therein, a vacuum supply box extending in contiguous relationship with and on one side of said vacuum belt and having apertures therein for applying a suction force through said perforations, a flexible restraining member mounted adjacent to the belt on the other side thereof for retaining a stack of flat articles with the foremost article in engagement with the face of said belt, said foremost articles being caused to move with the belt in a forward direction laterally away from said stack and past said restraining member upon the application of said suction force, means preventing the second article in said stack from moving with the foremost article until the foremost article has advanced therefrom the distance necessary to place itself in a predetermined overlapped relationship with the second article, said apertures in the vacuum supply box extending in the direction of the belt for a sufficient distance on both sides of said restraining member whereby said vacuum belt and vacuum supply box are jointly operable to move said articles past said restraining member in said overlapped relationship with the articles traveling forwardly together with the belt, and means adjacent the end of one straight path of motion of said belt for directly accelerating the forward motion of the foremost article to space it from the second article.

6. Article separating apparatus comprising a movably mounted endless vacuum belt having a plurality of perforations therein, a vacuum supply box extending in contiguous relationship with and on one side of said vacuum belt and having apertures therein for applying a suction force through said perforations, a flexible restraining member mounted adjacent to the belt on the other side thereof for retaining a stack of flat articles with the foremost article in engagement with the face of said belt, said foremost article being caused to move with the belt in a forward direction laterally away from said stack and past said restraining member upon the application of said suction force, means preventing the second article in said stack from moving with the foremost article until the foremost article has advanced therefrom the distance necessary to place itself in a predetermined overlapped relationship with the second article, said apertures in the vacuum supply box extending in the direction of the belt for a sufficient distance on both sides of said restraining member whereby said vacuum belt and vacuum supply box are jointly operable to move said articles past said restraining member in said overlapped relationship with the articles traveling forwardly together with the belt, pinch rollers for maintaining said articles in said overlapped relationship on the belt in the absence of the suction force, and accelerating pinch rollers adjacent the end of one straight path of motion of said belt for directly accelerating the forward motion of the foremost article to space it from the second article.

7. Article separating apparatus comprising a movably mounted endless vacuum belt having a plurality of perforations therein, a vacuum supply box extending in contiguous relationship with and on one side of said vacuum belt and having apertures therein for applying a suction force through said perforations, a flexible restraining member mounted adjacent to the belt on the other side thereof for retaining a stack of flat articles with the foremost article in engagement with the face of said belt, said foremost article being caused to move with the belt in a forward direction laterally away from said stack and past said restraining member upon the application of said suction force, a spacer plate mounted adjacent the flat face of the belt for spacing the bulk of the stack from the belt, said plate preventing the second article in said stack from moving with the foremost article until the foremost article has advanced therefrom the distance necessary to place itself in a predetermined overlapped relationship with the second article, said apertures in the vacuum supply box extending in the direction of the belt for a sufficient distance on both sides of said restraining member whereby said vacuum belt and vacuum supply box are jointly operable to move said articles past said restraining member in said overlapped relationship with the articles traveling forwardly together with the belt, and means adjacent the end of one straight path of motion of said belt for directly accelerating the forward motion of the foremost article to space it from the second article.

8. Article separating apparatus comprising a movably mounted endless vacuum belt having a plurality of perforations therein, a vacuum supply box extending in contiguous relationship with and on one side of said vacuum belt and having apertures therein for applying a suction force through said perforations, a flexible restraining member mounted adjacent to the belt on the other side thereof for retaining a stack of flat articles with the foremost article in engagement with the face of said belt, said foremost article being caused to move with the belt in a forward direction laterally away from said stack and past said restraining member upon the application of said suction force, said belt being bent at a position just rearwardly of said restraining member to divert the leading edge of the second article in the stack from the belt and prevent the second article from moving with the foremost article until the foremost article has advanced therefrom the distance necessary to place itself in a predetermined overlapped relationship therewith, said apertures in the vacuum supply box extending in the direction of the belt for a sufficient distance on both sides of said restraining member whereby said vacuum belt and vacuum supply box are jointly operable to move said articles past said restraining member in said overlapped relationship with the articles traveling forwardly together with the belt, and means adjacent the end of one straight path of motion of said belt for directly accelerating the forward motion of the foremost articles to space it from the second article.

9. Article separating apparatus comprising a vacuum belt mounted for movement in a forward direction and having a plurality of perforations therein, a vacuum supplying mean contiguous with one side of said belt for applying a suction force through said perforations to affect articles adjacent the other side of the belt, a flexible restraining member mounted adjacent the other side of said belt, a spacer plate mounted adjacent the other side of the belt with the forward edge thereof spaced rearwardly from said restraining member, said spacer plate being adapted to support a stack of flat articles with their forward edges aligned adjacent to said restraining member and with the foremost article of said stack resting partially on said plate and partially on said belt, said vacuum supplying means directly applying said suction force through the belt for a sufficient distance on both sides of said restraining member to cause said foremost article to move forwardly with the belt past said restraining member and to cause the following article in the stack to move in predetermined overlapped relationship with said foremost article past the restraining member, and means spaced forwardly from the restraining member for directly accelerating the foremost article and spacing it from the following article.

10. Article separating apparatus comprising a vacuum belt mounted for movement in a forward direction and having a plurality of perforations therein, a vacuum supplying means contiguous with one side of said belt for applying a suction force through said perforations to affect articles adjacent the other side of the belt, a flexible restraining member mounted adjacent the other side of said belt for flexible movement toward and away from the belt, a spacer plate mounted adjacent the other side of the belt with the forward edge thereof spaced rearwardly from said restraining member, said spacer plate having a flat surface for supporting a stack of flat articles with their forward edges aligned adjacent to said restraining member and with the foremost article of said stack resting partially on said plate and partially on said belt, said flat surface of the plate being spaced from the belt and forming a slight angle with the plane of the belt adjacent said vacuum supplying means so as to direct the forward edge of the following article in the stack away from the belt, said vacuum supplying means being operable to cause said foremost article to move forwardly with the belt past said restraining member and to cause the following article in the stack to move in an overlapped relationship with the foremost article, the amount of overlap being predetermined by the spacing between the forward edge of said spacer plate and the restraining member, and accelerating pinch rollers spaced forwardly from the restraining member for directly accelerating the movement of the foremost article in the forward direction and spacing it from the following article.

11. Article separating apparatus according to claim 10 wherein the spacer plate is provided with adjustable mounting means for controlling the distance between the forward edge of the plate and the restraining member to predetermine the amount of overlap between the articles moved past the restraining member.

12. Article separating apparatus comprising a vacuum belt mounted for movement in a forward direction and having a plurality of perforations therein, a vacuum supplying means contiguous with one side of said belt for applying a suction force through said perforations to affect articles adjacent the other side of the belt, a flexible restraining member mounted adjacent the other side of the belt, a spacer plate mounted adjacent the other side of the belt with the forward edge thereof spaced rearwardly from said restraining member, said spacer plate being adapted to support a stack of flat articles with their forward edges aligned adjacent to said restraining member and with the foremost article of said stack resting partially on said plate and partially on said belt, said vacuum supplying means being operable to apply said suction force on both sides of said restraining member to cause said foremost article and the following article in the stack to be moved with the belt past said restraining member in overlapped relationship, the amount of overlap being determined by the spacing between the forward edge of said plate and the restraining member, pinch rollers for retaining said articles on the belt in said overlapped relationship at that portion of the belt path forward of the portion at which the suction force is applied, and means adjacent the extension of said belt path for accelerating the forward motion of the foremost article to space it from the following article.

13. Article separating apparatus comprising a belt mounted for movement in a forward direction, means for applying a suction force to one side of said belt to affect a stack of flat articles placed on the other side of the belt with the foremost article in said stack in engagement with the other side of the belt, a restraining member flexibly positioned adjacent the other side of the belt to prevent the bulk of the stack from moving with said belt but to allow the foremost article to be moved forwardly with said belt, said belt being deflected at a position just rearwardly of the restraining member to slightly alter its path of travel so that the forward edge of the article following said foremost article will be diverted from said belt and restrained by said restraining member from moving with the foremost article until a sufficient portion of said following article is affected by the suction force so that said forward edge is pulled past the restraining member into overlapped relationship with said foremost article, means for maintaining said articles in overlapped relationship on said belt for movement therewith forwardly of said restraining member in the absence of said suction force, and means spaced from said restraining member for directly accelerating the foremost article to space it from the following article.

14. Article separating apparatus comprising a belt mounted for movement in a forward direction, means for applying a suction force to one side of said belt to affect a stack of flat articles placed on the other side of the belt with the foremost article in said stack in engagement with the other side of the belt, a restraining member flexibly positioned adjacent the other side of the belt to prevent the bulk of the stack from moving with said belt but to allow the foremost article to be moved forwardly with said belt, said belt being deflected at a position just rearwardly of the restraining member to slightly alter its path of travel so that the forward edge of the article following said foremost article will be diverted from said belt and restrained by said restraining member from moving with the foremost article until a sufficient portion of said following article is affected by the suction force so that said forward edge is pulled past the restraining member into overlapped relationship with said foremost article, the deflection in the path of travel of said belt being such that the portions of the belt on either side of the deflection form an included angle of from about 178 degrees to about 179 degrees, and accelerating pinch rollers spaced from said restraining member for directly accelerating the foremost article to space it from the following article.

References Cited by the Examiner
UNITED STATES PATENTS

| | | | |
|---|---|---|---|
| 2,023,531 | 12/1935 | Kleinschmit et al. | 271—38 |
| 2,812,178 | 11/1957 | Hagren | 271—29 |
| 2,995,361 | 8/1961 | Lopez | 271—32 |

M. HENSON WOOD, Jr, *Primary Examiner.*

SAMUEL F. COLEMAN, *Examiner.*